United States Patent
Kaimori (10) Patent No.: US 10,664,231 B2
(45) Date of Patent: May 26, 2020

(54) IMAGE FORMING APPARATUS

(71) Applicant: SHARP KABUSHIKI KAISHA, Sakai, Osaka (JP)

(72) Inventor: Hiromi Kaimori, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/351,101

(22) Filed: Mar. 12, 2019

(65) Prior Publication Data

US 2019/0303097 A1    Oct. 3, 2019

(30) Foreign Application Priority Data

Mar. 28, 2018 (JP) ................. 2018-062169

(51) Int. Cl.
*H04N 1/00* (2006.01)
*G06F 3/16* (2006.01)
*H04R 27/00* (2006.01)

(52) U.S. Cl.
CPC ......... *G06F 3/167* (2013.01); *H04N 1/00488* (2013.01); *H04R 27/00* (2013.01)

(58) Field of Classification Search
CPC ...... G06F 3/167; H04N 1/00488; H04R 27/00

USPC ....................................... 358/1.13
See application file for complete search history.

(56) References Cited

U.S. PATENT DOCUMENTS

2005/0069336 A1    3/2005  Kotani
2008/0304094 A1*  12/2008  Teshima ............ G03G 15/5016
                                                    358/1.14
2009/0027405 A1*   1/2009  Kaga .................... G09G 5/006
                                                    345/520

FOREIGN PATENT DOCUMENTS

JP    2004-258282 A    9/2004
JP    2005-096246 A    4/2005

* cited by examiner

*Primary Examiner* — Saeid Ebrahimi Dehkordy
(74) *Attorney, Agent, or Firm* — ScienBiziP, P.C.

(57) ABSTRACT

A multifunction peripheral (image forming apparatus) capable of voice guidance includes a voice output unit, a storage unit in which voice guidance data for voice guidance is stored, a control unit that performs control to output voice guidance from the voice output unit, and a communication unit that performs communication connection with an external apparatus. In a case where public announcement data that is transmitted from the external apparatus is received, public announcement based on the public announcement data is output from the voice output unit.

7 Claims, 10 Drawing Sheets

| IDENTIFICATION INFORMATION | APPARATUS CONFIGURATION |
|---|---|
| 1 | HIGH-SPEED MACHINE |
| 2 | STANDARD MACHINE |

| IDENTIFICATION INFORMATION | INSTALLATION PLACE |
|---|---|
| 11 | GENERAL REGION |
| 12 | SPECIFIC REGION |

| WEIGHTING LEVEL | (DETERMINATION) | (CONTENT) |
|---|---|---|
| 0 | (EMERGENCY: LOW, IMPORTANCE: LOW) | ANNOUNCEMENT OF RADIO GYMNASTICS, ETC. |
| 1 | (EMERGENCY: LOW, IMPORTANCE: HIGH) | CALL BY EXTENSION, PUBLIC ANNOUNCEMENT WITH LOW EMERGENCY, ETC. |
| 2 | (VOICE GUIDANCE) | |
| 3 | (EMERGENCY: HIGH, IMPORTANCE: LOW) | CALL BY OUTSIDE LINE OR VISITOR, ETC. |
| 4 | (EMERGENCY: HIGH, IMPORTANCE: HIGH) | EARTHQUAKE EARLY WARNING, TSUNAMI WARNING, EVACUATION ADVISORY, ETC. |

(a) ORIGINAL SENTENCE: "ABCD, EFG. HIJK, LMN."

(b) SENTENCE REPRODUCED BEFORE INTERRUPTION:
"ABCD, EFG. HI (SUSPENDED HERE)"

(c) SENTENCE TO BE REPRODUCED AFTER INTERRUPTION ENDS:
"HIJK, LMN."

IMAGE FORMING APPARATUS

BACKGROUND

1. Field

The present disclosure relates to an image forming apparatus such as a copier, a printer, or a facsimile, and particularly relates to an image forming apparatus that has a voice guidance function.

2. Description of the Related Art

A conventional digital multifunction peripheral (hereinafter, referred to as a "multifunction peripheral"), which is an image forming apparatus that includes an image forming unit, a scanner, and the like and has a plurality of functions, captures an original image that is input through the scanner as image data and performs image recording of the image data with the image data stored in a memory, in accordance with a condition set by a user, such as the number of copies, to complete a recorded matter.

Among multifunction peripherals constituted in this manner, a multifunction peripheral that has a voice guidance function of giving explanation by voice for explaining a state, an operation method, or the like of the multifunction peripheral has been known recently.

As a related art, for example, it is disclosed that, in an image forming apparatus that has a voice guidance function, second voice guidance is executed by interruption while first voice guidance is executed (refer to Japanese Patent No. 4415625).

As another example, it is disclosed that, in an image forming apparatus that has a voice guidance function, a method of, when second voice guidance is executed by interruption while first voice guidance is executed, resuming the first voice guidance after the second voice guidance ends is provided (refer to Japanese Unexamined Patent Application Publication No. 2004-258282).

According to the related arts described above, both Japanese Patent No. 4415625 and Japanese Unexamined Patent Application Publication No. 2004-258282 describe the voice guidance but do not mention announcement transmitted from outside the apparatus, such as public announcement.

Accordingly, in order to give public announcement, for example, a voice output device such as a speaker is to be separately installed and a wiring work or the like is to be executed.

When being used in an office or the like, one or more multifunction peripherals are placed in one room in many cases. Thus, when public announcement is given by utilizing a multifunction peripheral, the public announcement is able to be easily given without executing a wiring work for the public announcement on a ceiling or the like.

It is desirable to provide an image forming apparatus capable of outputting voice with a simple configuration by using a voice output unit of the image forming apparatus and outputting voice data from outside.

SUMMARY

According to an aspect of the disclosure, there is provided an image forming apparatus capable of voice guidance. The image forming apparatus includes a voice output unit, a storage unit in which first voice data for voice guidance is stored, a control unit that performs control to output first voice based on the first voice data from the voice output unit, and a communication unit that performs communication connection with an outside. In a case where second voice data that is transmitted from the outside is received, second voice based on the second voice data is output from the voice output unit.

DESCRIPTION OF THE EMBODIMENTS

First Embodiment

Hereinafter, a first embodiment of the disclosure will be described with reference to drawings.

Figure 1:
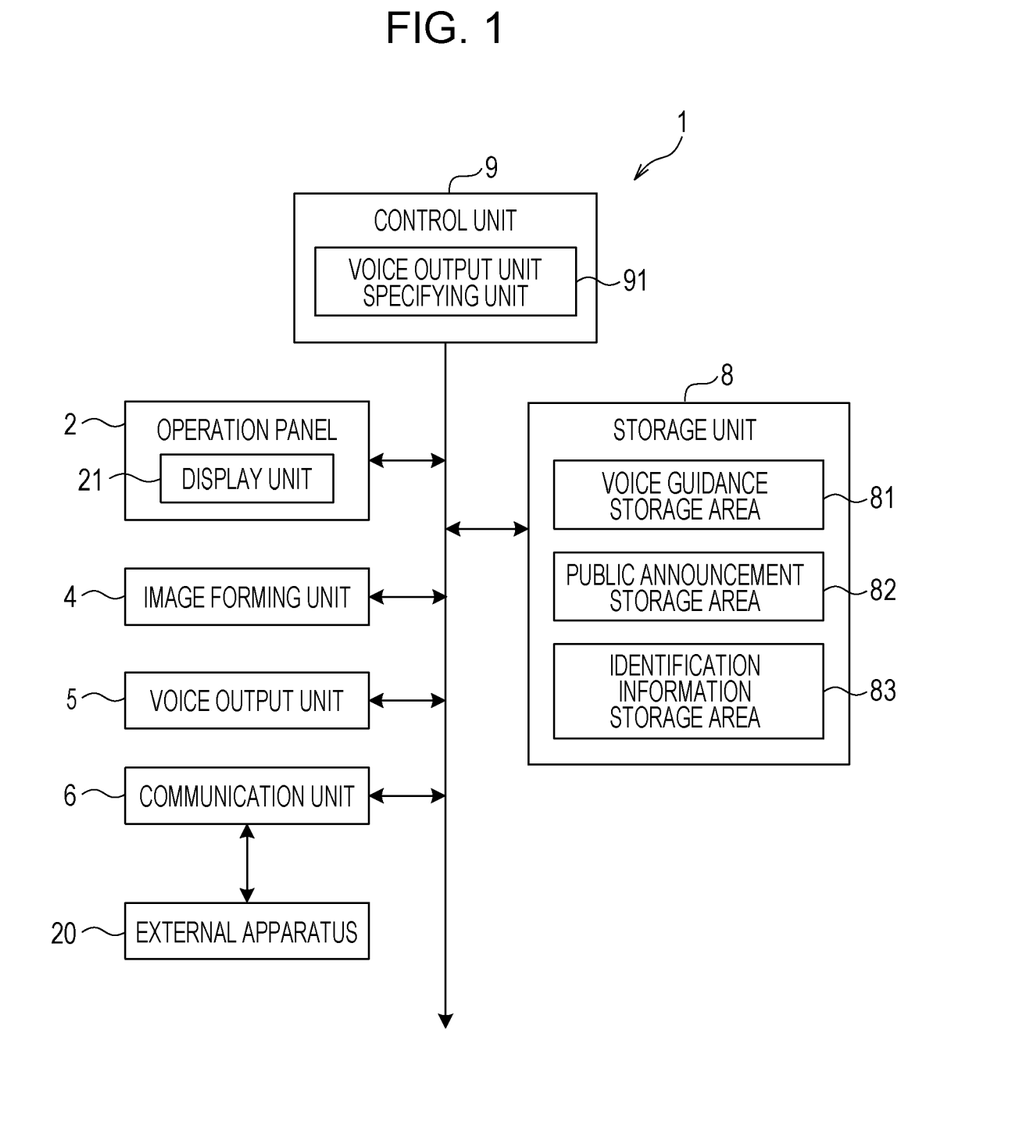
FIG. 1 is a block diagram illustrating a configuration of a multifunction peripheral (image forming apparatus) according to a first embodiment.
Figure 2:
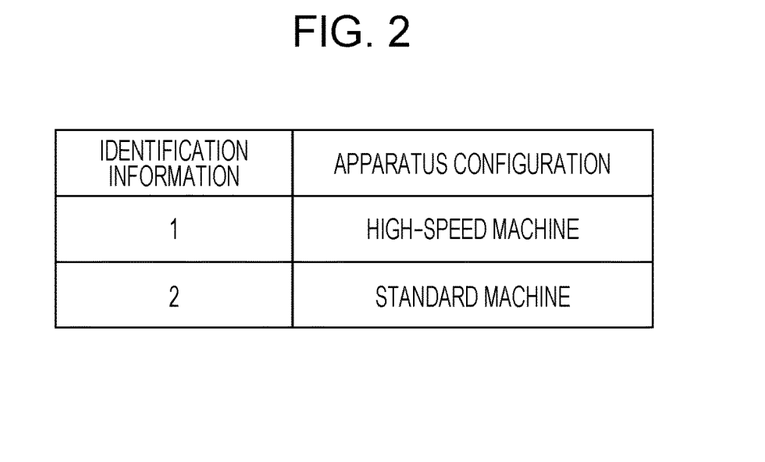
FIG. 2 is a table indicating identification information of the multifunction peripheral.

FIG. 1 is a block diagram illustrating a configuration of a multifunction peripheral (image forming apparatus) according to a first embodiment of the disclosure, which is an example of an embodiment of the disclosure, and FIG. 2 is a table indicating identification information of the multifunction peripheral.

As illustrated in FIG. 1, according to the first embodiment, a multifunction peripheral (image forming apparatus) 1 having a voice guidance function includes a communication unit 6 that performs communication connection with an external apparatus 20, and is characterized in that when public announcement data (second voice data) that is transmitted from the external apparatus 20 is received, public announcement (second voice) is output (reproduced) from a voice output unit 5 included in the multifunction peripheral 1.

As illustrated in FIG. 1, the multifunction peripheral 1 according to the first embodiment has a configuration mainly including an operation panel 2, an image forming unit 4, the voice output unit 5, the communication unit 6, a storage unit 8, and a control unit 9.

The operation panel 2 includes a display unit 21 on which an operation screen is displayed or a touch operation is able to be performed.

On the basis of image data that is input, the image forming unit 4 forms an image to be output.

The voice output unit 5 is a speaker or the like from which voice is output. Here, voice guidance (first voice) is output from the voice output unit 5.

The communication unit 6 has a configuration capable of communication connection with an outside. Here, the communication unit 6 is connected with a broadcasting apparatus as the external apparatus 20, which performs public announcement.

The storage unit 8 has a function as a working memory in which a result of calculation or processing by a CPU (not illustrated) is temporarily stored and a function as a frame memory in which image data is stored. Then, the storage unit 8 stores image data that is input to the apparatus by a terminal computer or the like from the outside of the apparatus, image data of an original that is read through a scanner unit, or the like.

Moreover, in the first embodiment, the storage unit 8 includes a voice guidance storage area 81 in which voice data (first voice data) of the voice guidance (first voice) is stored, a public announcement storage area 82 in which the public announcement data (second voice data) transmitted from the external apparatus 20 is stored, and an identification information storage area 83 to identify a multifunction peripheral.

As illustrated in FIG. 2, in the identification information storage area 83, identification information 1 and 2 to identify whether the multifunction peripheral 1 is a high-speed machine or a standard machine by using an apparatus configuration as identification information are stored.

The control unit 9 controls action of the entire apparatus and also controls an operation of the multifunction peripheral 1.

The control unit 9 has a voice output unit specifying unit 91 that specifies a voice output unit 5 from which the second voice is output.

When there are a plurality of multifunction peripherals 1 in a vicinity of the multifunction peripheral 1, the voice output unit specifying unit 91 specifies from which voice output unit 5 of a multifunction peripheral 1 the second voice is to be output. For example, the second voice may be output from a multifunction peripheral 1 not executing job processing among the plurality of multifunction peripherals 1, or the second voice may be output from a standard machine in a case where there are a high-speed machine and the standard machine among the plurality of multifunction peripherals 1.

Next, processing in which public announcement data is received by the multifunction peripheral 1 of the first embodiment and is output from the multifunction peripheral 1 will be described along a flowchart.

Figure 3:
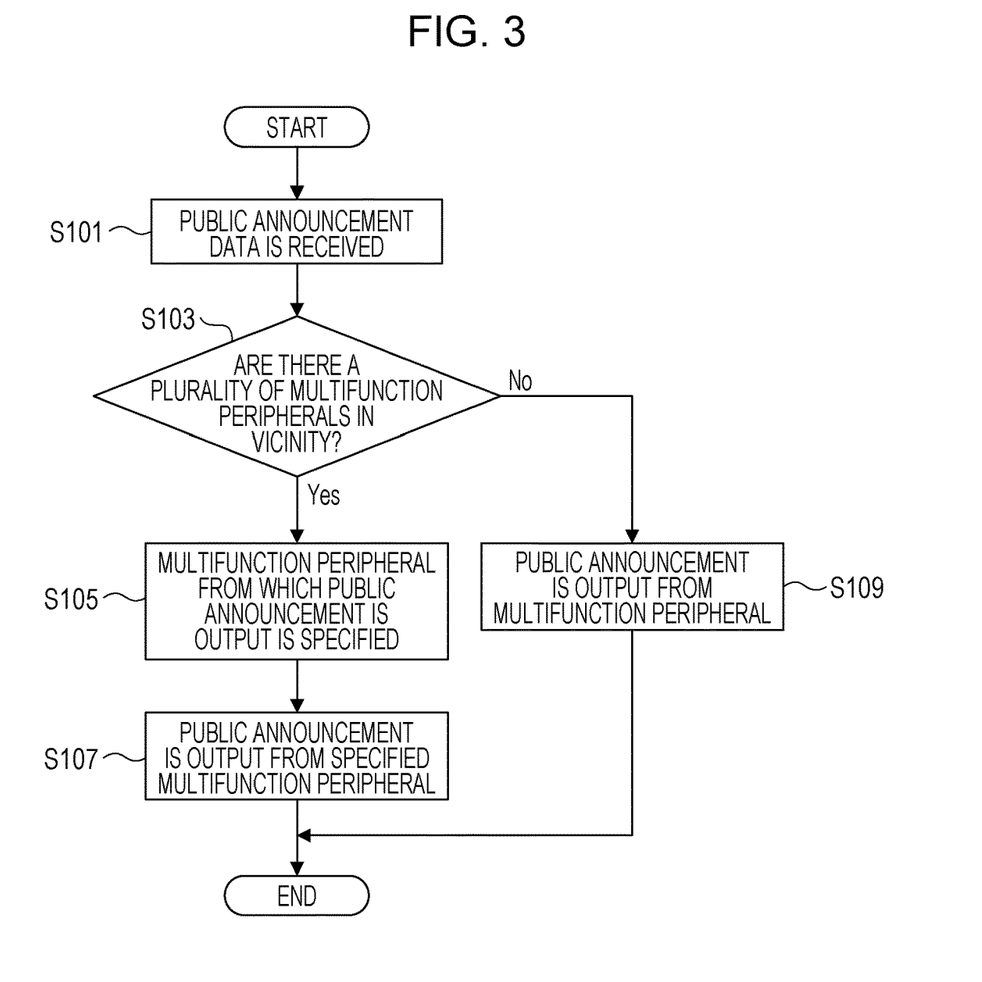
FIG. 3 is a flowchart of a processing process in which public announcement that is received by the multifunction peripheral is output.

FIG. 3 is a flowchart of a processing process in which public announcement that is received by the multifunction peripheral according to the first embodiment is output.

As illustrated in FIG. 3, in a case where public announcement data is received by the multifunction peripheral 1 (step S101), whether or not there are a plurality of multifunction peripherals 1 in the vicinity is determined by the control unit 9 (step S103).

In a case where it is determined at step S103 that there are the plurality of multifunction peripherals 1 in the vicinity, a multifunction peripheral 1 from which public announcement is output is specified by the voice output unit specifying unit 91 (step S105).

At step S105, whether or not each of the multifunction peripherals 1 is a high-speed machine or a standard machine is determined on the basis of identification information of the multifunction peripheral 1, and in a case where the multifunction peripheral 1 is a standard machine, a voice output unit 5 of the multifunction peripheral 1 that is the standard machine is specified. Moreover, in a case where there are a plurality of multifunction peripherals 1 that are standard machines or in a case where there are only multifunction peripherals 1 that are high-speed machines, a voice output unit 5 of a multifunction peripheral 1 not executing job processing is specified.

Then, the public announcement is output from the specified voice output unit 5 of the multifunction peripheral 1 (step S107).

On the other hand, in a case where it is determined at step S103 that there are not a plurality of multifunction peripherals 1 in the vicinity, the public announcement is output from the voice output unit 5 of the multifunction peripheral 1 (step S109).

In this manner, the public announcement is able to be output from the voice output unit 5 of the multifunction peripheral 1.

With the configuration described above, the multifunction peripheral 1 capable of voice guidance according to the first embodiment has a configuration including the communication unit 6 that performs communication connection with the external apparatus 20, and has a configuration in which, when public announcement data transmitted from the external apparatus 20 is received, voice of public announcement based on the public announcement data is output from the voice output unit 5, making it possible to output the voice of the public announcement with a simple configuration without separately providing a voice output device.

Moreover, in the first embodiment, in a case where there are different multifunction peripherals 1 in the vicinity of a place where the multifunction peripheral 1 is installed, whether or not each of the multifunction peripherals 1 is a high-speed machine or a standard machine is determined on the basis of the identification information of the multifunction peripheral 1, and when there is a multifunction peripheral 1 that is a standard machine, a voice output unit 5 of the multifunction peripheral 1 that is the standard machine is caused to give public announcement, thus making it possible to easily hear the public announcement because sound from the standard machine is smaller than that from the high-speed machine.

In the case where there are a plurality of multifunction peripherals 1 that are standard machines or in the case where there are only multifunction peripherals 1 that are high-speed machines, the voice output unit 5 of the multifunction peripheral 1 not executing job processing is caused to give public announcement, thus making it possible to hear the public announcement without difficulty in hearing the public announcement due to job processing.

Note that, an output of the public announcement may be performed directly from the voice output unit 5 on the basis of the received public announcement data, or the public announcement data may be temporarily stored in the public announcement storage area 82 of the storage unit 8 and the public announcement data may be called out from the storage unit 8 and output from the voice output unit 5.

Second Embodiment

Next, a second embodiment will be described with reference to drawings.

Note that, for convenience of description, a configuration having the same function as that of the first embodiment will be given the same reference sign, and description thereof will be omitted.

Figure 4:
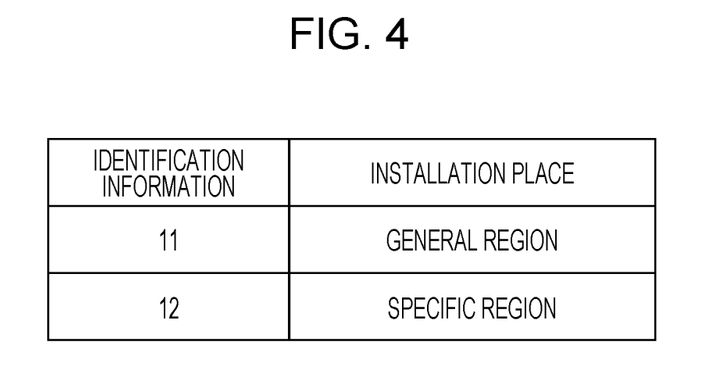
FIG. 4 is a table indicating identification information of a multifunction peripheral of the second embodiment.
Figure 5:
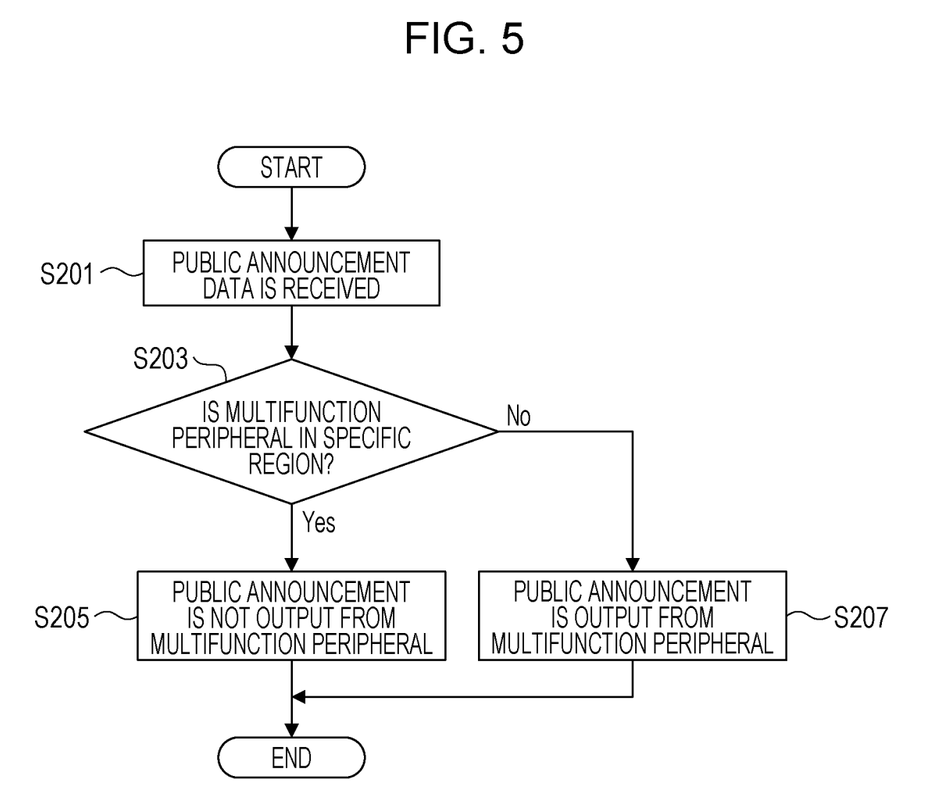
FIG. 5 is a flowchart of a processing process in which public announcement that is received by the multifunction peripheral is output.

FIG. 4 is a table indicating identification information of a multifunction peripheral of the second embodiment, and FIG. 5 is a flowchart of a processing process in which public announcement that is received by the multifunction peripheral is output.

The second embodiment is characterized in that an installation place is used as the identification information of the multifunction peripheral 1 instead of using the apparatus configuration as the identification information of the multifunction peripheral 1 as in the first embodiment and an output of the public announcement is restricted in accordance with the installation place of the multifunction peripheral.

As illustrated in FIG. 4, as the identification information of the multifunction peripheral 1, identification information 11 and 12 to identify, by using the installation place of the multifunction peripheral 1 as the identification information, whether or not the installation place is a general region (e.g., an inside of a normal office or the like) which is not particularly specified or a specific region (e.g., a conference room or the like) which is set in advance are stored.

Next, processing in which public announcement data is received by the multifunction peripheral 1 of the second embodiment and output from the multifunction peripheral 1 will be described along a flowchart.

As illustrated in FIG. 5, in a case where public announcement data is received by the multifunction peripheral 1 (step S201), whether or not the multifunction peripheral 1 is installed in a specific region is determined by the control unit 9 (step S203).

In a case where it is determined at step S203 that the multifunction peripheral 1 is installed in the specific region, the multifunction peripheral 1 is not specified by the voice output unit specifying unit 91 as the multifunction peripheral 1 from which public announcement is output, so that the public announcement is not given (step S205).

On the other hand, in a case where it is determined at step S203 that the multifunction peripheral 1 is not installed in the specific region, the public announcement is output from the voice output unit 5 of the multifunction peripheral 1 (step S207).

In this manner, the multifunction peripheral 1 from which the public announcement is output is able to be specified.

With the configuration described above, according to the second embodiment, in the multifunction peripheral 1 capable of voice guidance, an installation place is used as the identification information of the multifunction peripheral 1 to identify whether the installation place is a general region (e.g., an inside of a normal office or the like) which is not particularly specified or a specific region (e.g., a conference room or the like) which is set in advance, so that whether or not to give public announcement is able to be set in accordance with the place where the multifunction peripheral 1 is installed.

Note that, in the second embodiment, whether the installation place of the multifunction peripheral 1 is a specific region or general region is used as the identification information, but additionally, the multifunction peripheral from which the public announcement is output may be set in detail in accordance with a plurality of installation places.

Third Embodiment

Next, a third embodiment will be described with reference to drawings.

Note that, for convenience of description, a configuration having the same function as that of the first embodiment will be given the same reference sign, and description thereof will be omitted.

Figure 6:
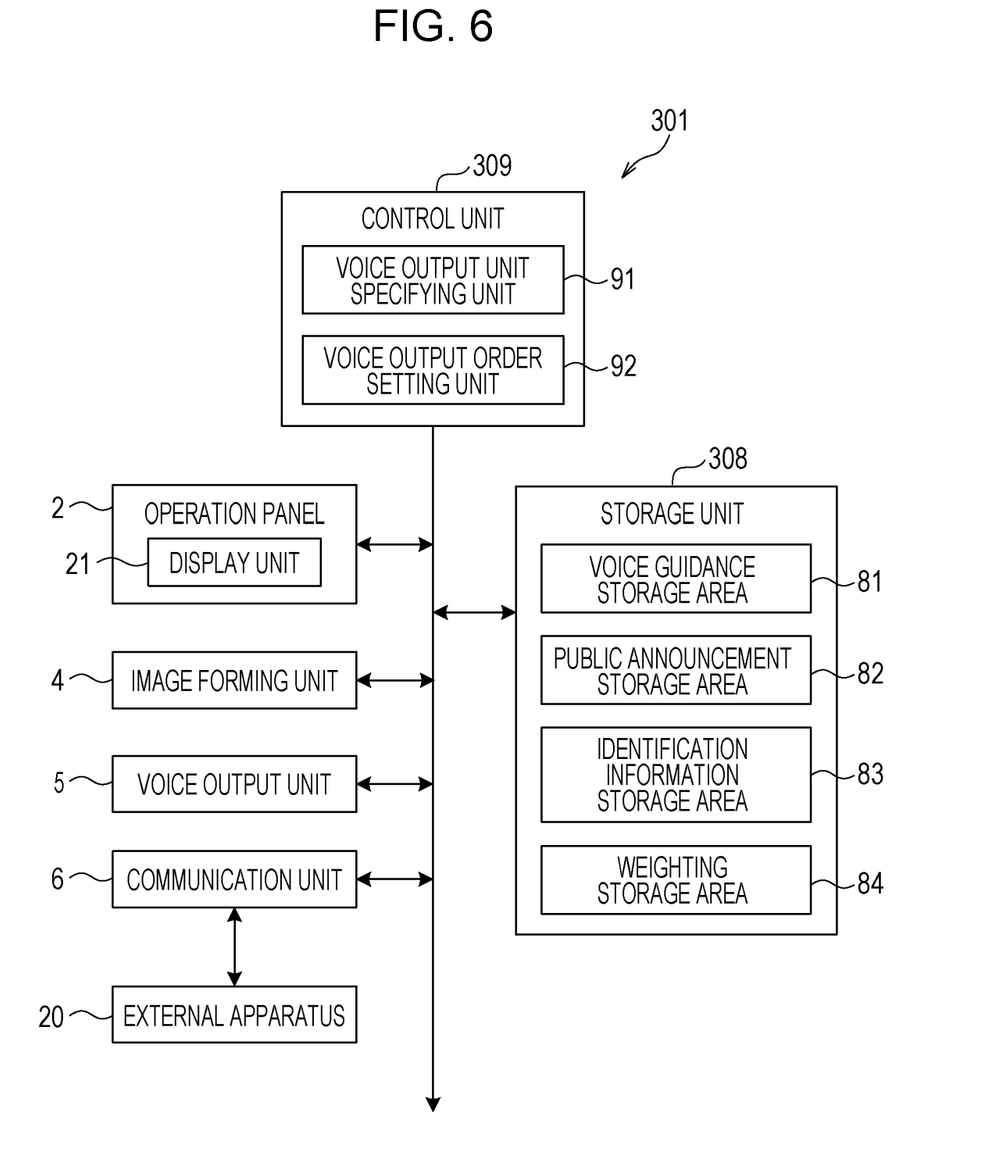
FIG. 6 is a block diagram illustrating a configuration of a multifunction peripheral according to a third embodiment.
Figure 7:
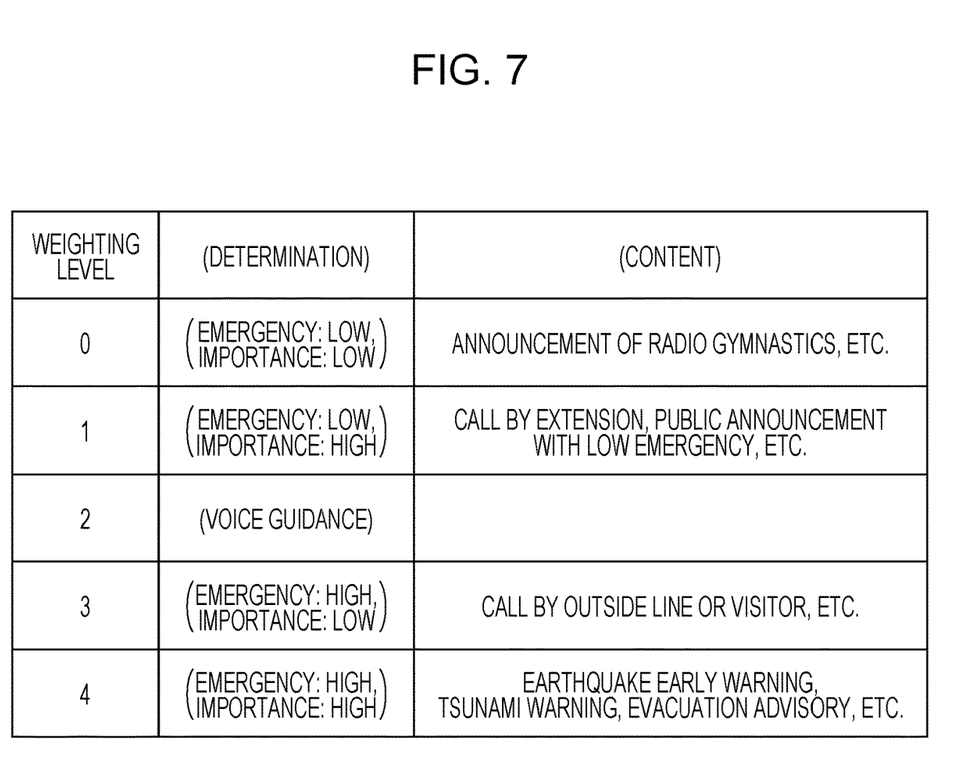
FIG. 7 is a table indicating weighting of public announcement that is transmitted to the multifunction peripheral.
Figure 8:
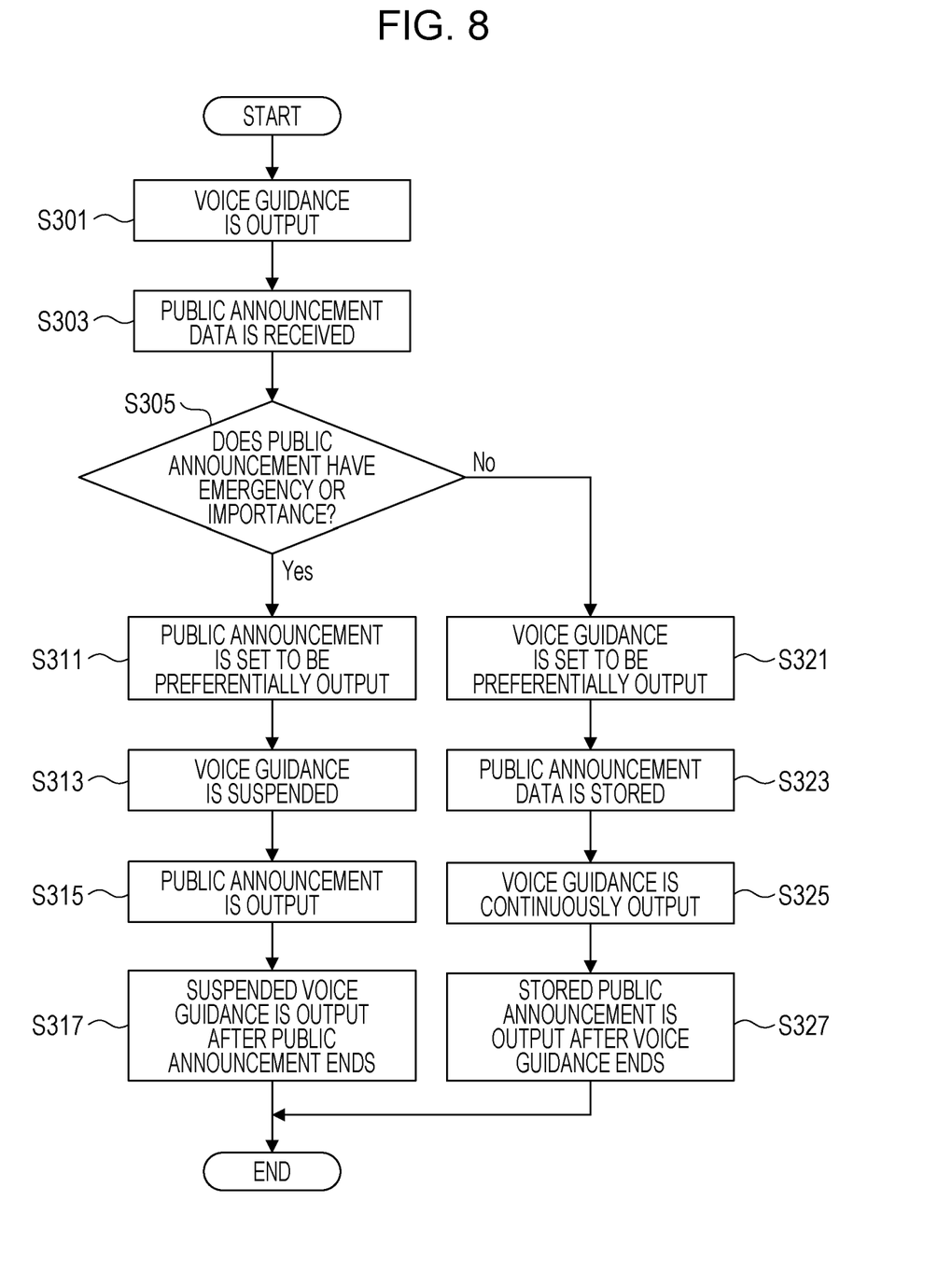
FIG. 8 is a flowchart of a processing process in which public announcement that is received by the multifunction peripheral is output.

FIG. 6 is a block diagram illustrating a configuration of a multifunction peripheral according to the third embodiment, FIG. 7 is a table indicating weighting of public announcement that is transmitted to the multifunction peripheral, and FIG. 8 is a flowchart of a processing process in which the public announcement that is received by the multifunction peripheral is output.

As illustrated in FIG. 6, a multifunction peripheral 301 according to the third embodiment is characterized in that, in addition to the configuration of the multifunction peripheral 1 according to the first embodiment, a storage unit 308 includes a weighting storage area 84 in which weighting information is stored and a control unit 309 includes a voice output order setting unit 92, and determination of emergency and importance is performed on the basis of the received public announcement data, weighting of the public announcement data is performed on the basis of a result of the determination, and an output order of voice data to be output from the voice output unit 5 is set on the basis of information of the weighting.

In the third embodiment, emergency and importance of the public announcement data are determined in accordance with a content of the public announcement data on the basis of, for example, a "weighting table" illustrated in FIG. 7, and a weighting level is specified on the basis of a result of the determination.

Specifically, as illustrated in FIG. 7, weighting levels are set to, for example, 5 stages of 0, 1, 2, 3, and 4 and weighting of the public announcement is determined.

In a case where the public announcement is announcement of radio gymnastics or the like, it is determined that a degree of the emergency is "low" and a degree of the importance is "low", so that the weighting level is "0".

In a case where the public announcement is a call by an extension or announcement with low emergency, it is determined that a degree of the emergency is "low" and a degree of the importance is "high", so that the weighting level is "1".

The weighting level of voice guidance is "2".

In a case where the public announcement is a call by an outside line or a visitor, it is determined that a degree of the emergency is "high" and a degree of the importance is "low", so that the weighting level is "3".

In a case where the public announcement is announcement with high emergency, such as an earthquake early warning, a tsunami warning, or an evacuation advisory, it is determined that a degree of the emergency is "high" and a degree of the importance is "high", so that the weighting level is "4".

As described above, the order in which the public announcement data which is received by the multifunction peripheral 301 and whose weighting level is determined is output from the voice output unit 5 is set by the voice output order setting unit 92 in accordance with the weighting level of the public announcement data.

Next, processing in which public announcement is received by the multifunction peripheral 301 of the third embodiment and output from the multifunction peripheral 301 will be described along a flowchart.

As illustrated in FIG. 8, voice guidance is output from the multifunction peripheral 301, (step S301). At this time, when public announcement data is received (step S303), whether or not the public announcement data has emergency or importance is determined by the control unit 309 (step S305).

In a case where it is determined at step S305 that the public announcement data has emergency or importance, the public announcement is set by the voice output order setting unit 92 to be output prior to the voice guidance (step S311). Then, the voice guidance is suspended (step S313) and the public announcement is output (step S315). The suspended voice guidance is output after the public announcement ends (step S317).

On the other hand, in a case where it is determined at step S305 that the public announcement data does not have emergency or importance, the voice guidance is set by the voice output order setting unit 92 to be output prior to the public announcement (step S321). Then, the public announcement data is stored in the storage unit 308 (step S323). The voice guidance is continuously output (step S325). The stored public announcement is output after the voice guidance ends (step S327).

In this manner, in a case where the public announcement is received while the voice guidance is output (reproduced), the output is able to be performed by changing an output state in accordance with the emergency or the importance of the public announcement.

With the configuration described above, according to the third embodiment, in the multifunction peripheral 301 capable of voice guidance, the storage unit 308 includes the weighting storage area 84 in which the weighting information is stored, and the control unit 309 includes the voice output order setting unit 92, so that weighting of voice data to be output is able to be performed on the basis of a result of determination for emergency and importance of received public announcement data and the voice data is able to be output in order from voice data to be prioritized by setting an output order on the basis of information of the weighting.

Fourth Embodiment

Next, a fourth embodiment will be described with reference to drawings.

Note that, for convenience of description, a configuration having the same function as that of the first embodiment will be given the same reference sign, and description thereof will be omitted.

Figure 9:
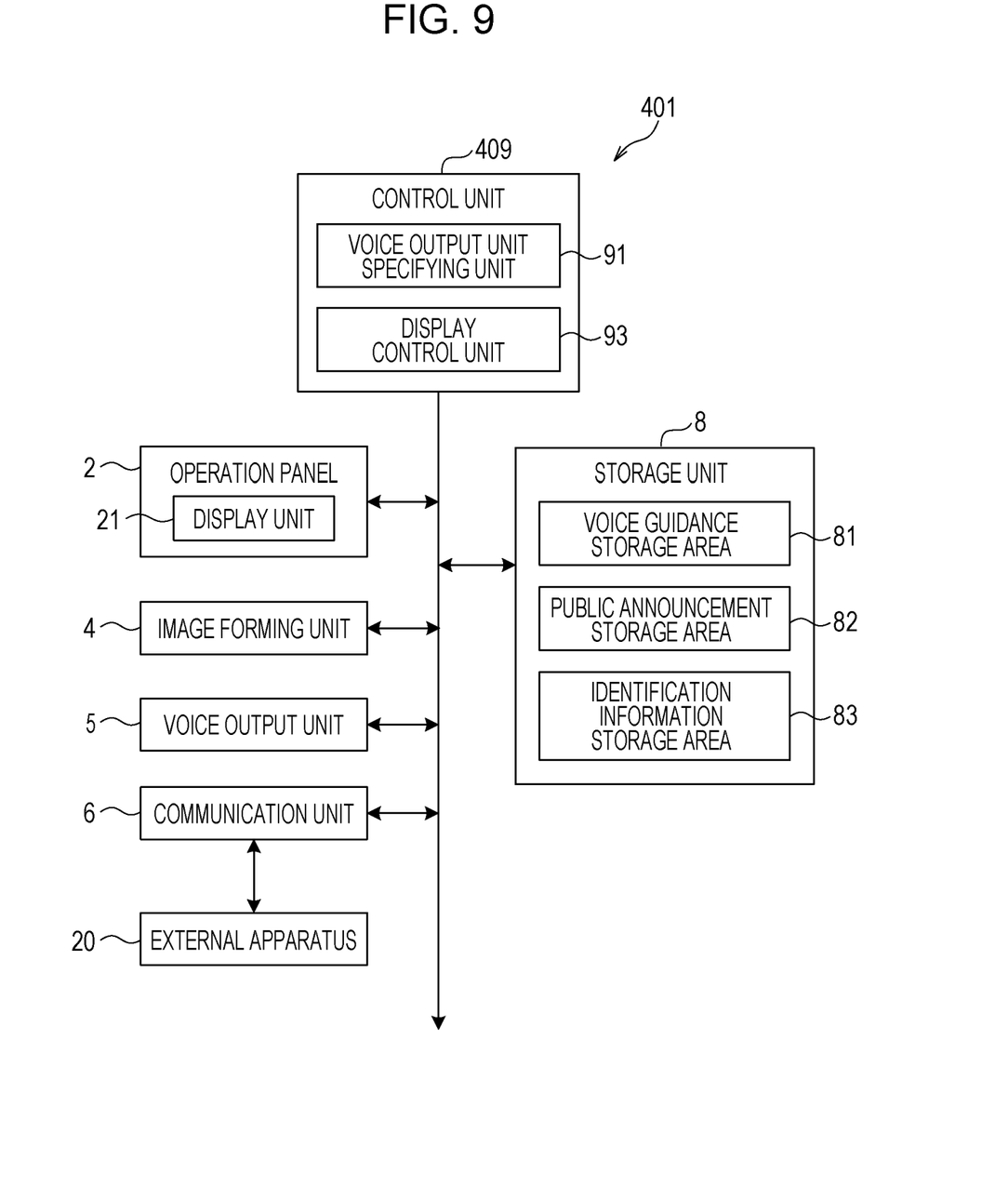
FIG. 9 is a block diagram illustrating a configuration of a multifunction peripheral according to a fourth embodiment.
Figure 10:
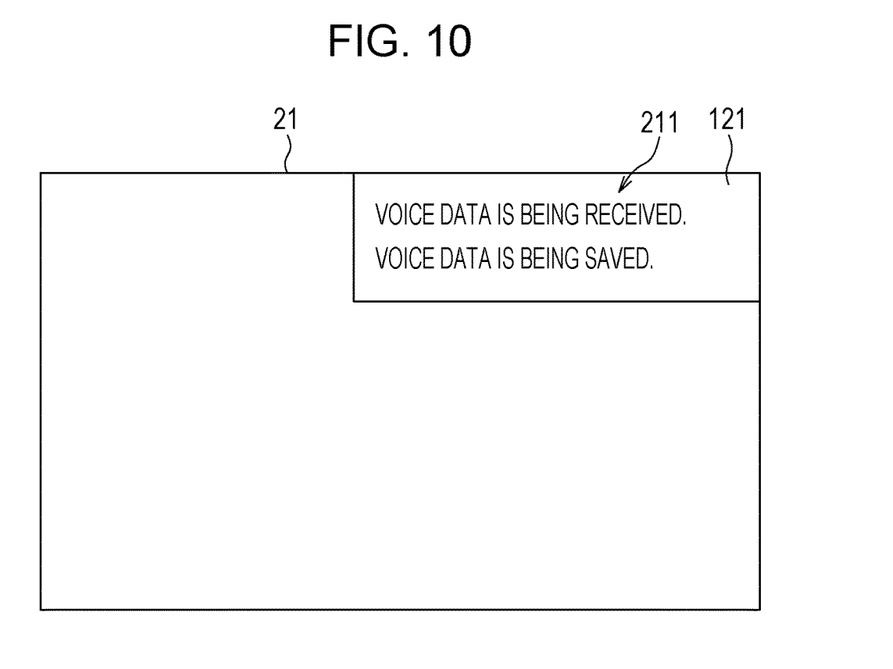
FIG. 10 is an explanatory view illustrating an exemplary embodiment 1 of a display screen related to voice data that is displayed in a display unit of the multifunction peripheral.
Figure 11:
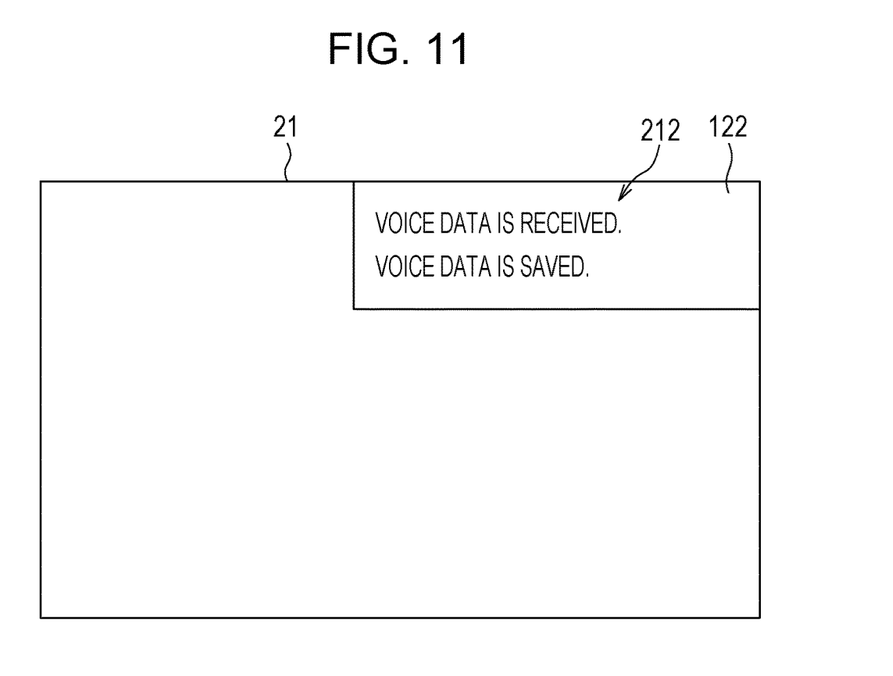
FIG. 11 is an explanatory view illustrating an exemplary embodiment 2 of a display screen related to voice data that is displayed in the display unit.
Figure 12:
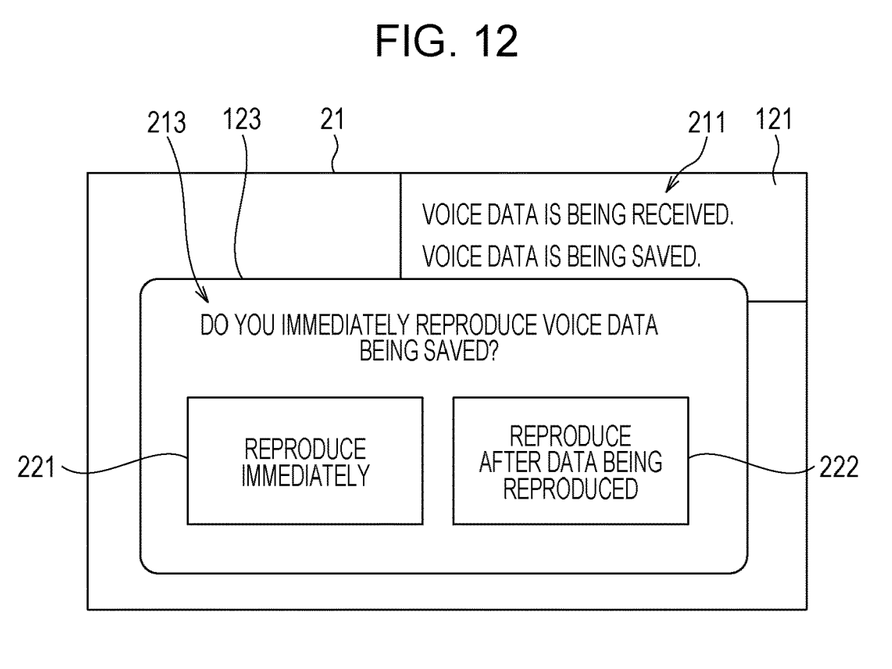
FIG. 12 is an explanatory view illustrating an exemplary embodiment 3 of a display screen related to voice data that is displayed in the display unit.
Figure 13:
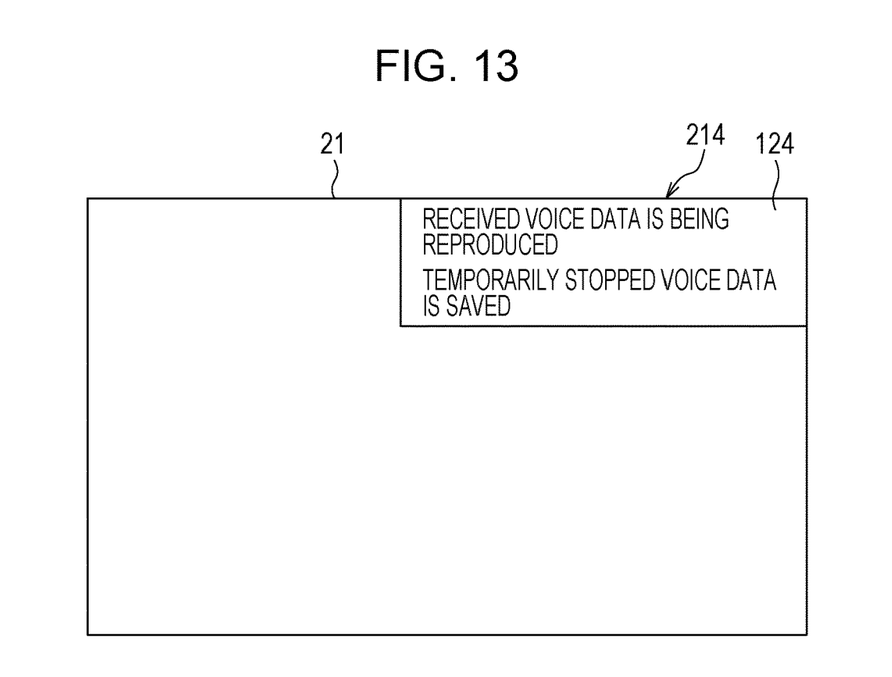
FIG. 13 is an explanatory view illustrating an exemplary embodiment 4 of a display screen related to voice data that is displayed in the display unit.

FIG. 9 is a block diagram illustrating a configuration of a multifunction peripheral according to a fourth embodiment, FIG. 10 is an explanatory view illustrating an exemplary embodiment 1 of a display screen related to voice data that is displayed in a display unit of the multifunction peripheral, FIG. 11 is an explanatory view illustrating an exemplary embodiment 2 of a display screen related to voice data that is displayed in the display unit, FIG. 12 is an explanatory view illustrating an exemplary embodiment 3 of a display screen related to voice data that is displayed in the display unit, and FIG. 13 is an explanatory view illustrating an exemplary embodiment 4 of a display screen related to voice data that is displayed in the display unit.

As illustrated in FIG. 9, a multifunction peripheral 401 according to the fourth embodiment includes, in addition to the configuration of the multifunction peripheral 1 according to the first embodiment, a display control unit 93 as a configuration of a control unit 409, and is characterized in that when public announcement data is received, a display screen related to the public announcement data is displayed on the display unit 21.

Exemplary Embodiment 1

In the exemplary embodiment 1, as illustrated in FIG. 10, when public announcement data is received, a display screen 121 that includes a message 211 indicating "Voice data is being received. The voice data is being saved." is displayed on the display unit 21.

Exemplary Embodiment 2

In the exemplary embodiment 2, as illustrated in FIG. 11, when the saving of the public announcement data is completed, a display screen 122 that includes a message 212 indicating "Voice data is received. The voice data is saved." is displayed on the display unit 21.

Exemplary Embodiment 3

In the exemplary embodiment 3, as illustrated in FIG. 12, when the public announcement data is received, a pop-up screen 123 about an instruction of reproduction of the voice data is displayed on the display unit 21 in addition to the display screen 121 that includes the message 211 indicating "Voice data is being received. The voice data is being saved.".

In the pop-up screen 123, together with a message 213 indicating "Do you immediately reproduce the voice data being saved?", a software button 221 in which "Reproduce immediately" is displayed and a software button 222 in which "Reproduce after data being reproduced" is displayed are displayed.

Exemplary Embodiment 4

In the exemplary embodiment 4, as illustrated in FIG. 13, when a touch operation of the software button 221 in which "Reproduce immediately" is displayed in the pop-up screen 123 illustrated in FIG. 12 is performed, a display screen 124 that includes a message 214 indicating "Received voice data is being reproduced. Temporarily stopped voice data is saved." is displayed on the display unit 21.

In the exemplary embodiment 4, in a case where the display screen 121 or 122 related to reception of the voice data is displayed on the display unit 21 as in the exemplary embodiment 1 or 2, by touching the display screen 121 or 122, the pop-up screen 123 of the exemplary embodiment 3 is displayed, so that whether or not to immediately reproduce the received voice data (here, referred to as "public announcement data") that is being saved is able to be selected.

In a case where the public announcement data is ready to be reproduced before the saving of the public announcement data is completed, the display screen 122 of the exemplary embodiment 2 is not displayed.

Furthermore, the voice data (here, referred to as "voice guidance data") that is previously reproduced is also temporarily stopped while the pop-up screen 123 of the exemplary embodiment 3 is displayed.

When the software button 221 of "Reproduce immediately" in the pop-up screen 123 is touched, "public announcement data" that is determined to have a low degree of priority and is thus saved is given. Then, the pop-up screen 123 is deleted to be switched to the display screen 124 of the exemplary embodiment 4.

At this time, by pressing the software button 221 of "Reproduce immediately", the weighting level of the "public announcement data" is replaced with "4 (maximum value)", and the weighting level of the "voice guidance data" is replaced with "[original weighting level]−1".

Moreover, in a case where the soft button 222 of "Reproduce after data being reproduced" is touched in the pop-up screen 123 of the exemplary embodiment 3, the pop-up screen 123 is deleted to be returned to the display screen 121 or the display screen 122, and the "voice guidance data" is sequentially reproduced. At this time, there is no change in a value of the weighting level.

When the display screen 124 of the exemplary embodiment 4 is touched, the display screen is returned to the pop-up screen 123 of the exemplary embodiment 3, and when the software button 221 of "Reproduce immediately" is touched, reproduction of the "voice guidance data" is resumed. At this time, the weighting level of the "public announcement data" is replaced with "3 (4 [maximum value]−1) and the weighting level of the "voice guidance data" is replaced with "4 (maximum value)". In this manner, by changing a reproduction state of the voice data to be reproduced, the weighting level of the voice data is able to be changed.

With the configuration described above, the multifunction peripheral 401 of the exemplary embodiment 4 includes the display control unit 93 as a configuration of the control unit 409, and when public announcement data is received, the display screen related to the public announcement data is displayed on the display unit 21, thus making it possible to visually notify a user of reception of public announcement. Then, by changing the reproduction state of the voice data to be reproduced, the weighting level of the voice data is able to be changed.

Fifth Embodiment

Next, a fifth embodiment will be described with reference to a drawing.

Note that, for convenience of description, a configuration having the same function as that of the first embodiment will be given the same reference sign, and description thereof will be omitted.

Figure 14:
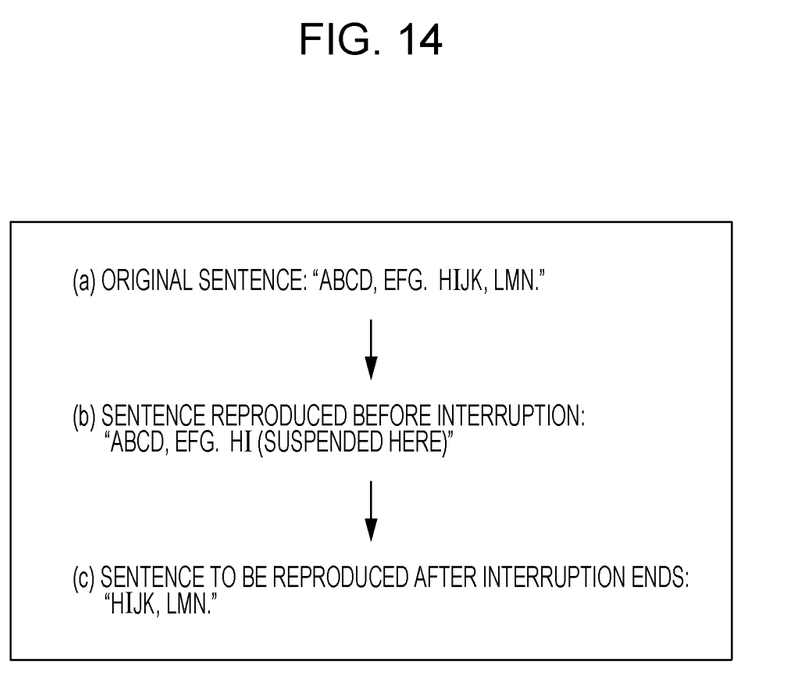
FIG. 14 is an explanatory view illustrating an example of an interruption timing during voice guidance by a multifunction peripheral according to a fifth embodiment.

FIG. 14 is an explanatory view illustrating an example of an interruption timing during voice guidance by a multifunction peripheral according to the fifth embodiment.

The fifth embodiment is characterized in that, in the multifunction peripheral 1, in a case where public announcement that is transmitted is output by suspending voice guidance while the voice guidance is output, when voice guidance data allows determination of a pause of the voice guidance, the output of the voice guidance is resumed by performing the output from a pause immediately before the pause at which the voice guidance is suspended.

Specifically, in a case where an original sentence of the voice guidance is, for example, "ABCD, EFG. HIJK, LMN." as illustrated in FIG. 14 and a sentence that is reproduced before the interruption by the public announcement due to the voice guidance being suspended to give the public announcement is "ABCD, EFG. HI (suspended here) ", control is performed so that a sentence to be reproduced after the interruption by the public announcement ends is "HIJK, LMN.".

With the configuration described above, according to the fifth embodiment, in the multifunction peripheral 1, even in the case where public announcement is given by interruption while voice guidance is output, and the voice guidance is suspended in a middle of a sentence thereof, when voice guidance data allows determination of a pause of the voice guidance, the output of the voice guidance is resumed by performing the output from a pause immediately before the pause at which the voice guidance is suspended, thus making it possible to accurately inform a content of the voice guidance.

As described above, the disclosure is not limited to each of the embodiments described above, and may be modified in various manners within the scope of the claims. A skilled in the art could obviously conceive various modified examples or correction examples within the scope of the claims, that is, an embodiment achieved by combining techniques which are appropriately modified within a range not departed from the gist of the disclosure is also encompassed in the technical scope of the disclosure.

The present disclosure contains subject matter related to that disclosed in Japanese Priority Patent Application JP 2018-062169 filed in the Japan Patent Office on Mar. 28, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus capable of voice guidance, the image forming apparatus comprising:
    voice output circuitry;
    a memory in which first voice data for voice guidance is stored;
    a control circuitry that performs control to output first voice based on the first voice data from the voice output circuitry; and
    communication circuitry that performs communication connection with an external apparatus, wherein
    in a case where second voice data that is transmitted from the external apparatus is received, second voice based on the second voice data is output from the voice output circuitry.

2. The image forming apparatus according to claim 1, wherein in a case where there are a plurality of the image forming apparatuses each of which includes the voice output circuitry and which are adjacent to each other, the second voice is output from an image forming apparatus that is specified.

3. The image forming apparatus according to claim 1, wherein an output of the second voice is restricted in accordance with an installation place of the image forming apparatus that includes the voice output circuitry.

4. The image forming apparatus according to claim 1, wherein
    the second voice data is stored, and
    whether to include at least emergency or importance is determined on a basis of the second voice data, and weighting of the second voice data is performed on a basis of a result of the determination.

5. The image forming apparatus according to claim 4, wherein an output order of voice data to be output from the voice output circuitry is set on a basis of information of the weighting of the second voice data.

6. The image forming apparatus according to claim 1, further comprising a display device, wherein
in a case where the second voice data is received, a display screen related to the second voice data is displayed in the display device.

7. The image forming apparatus according to claim 1, wherein in a case where the second voice is output by suspending the first voice while the first voice is output, when the first voice data allows determination of a pause of the first voice, an output of the first voice is resumed by performing the output from a pause immediately before a pause at which the first voice data is suspended.

* * * * *